United States Patent [19]
Kallenbach

[11] Patent Number: 5,588,511
[45] Date of Patent: Dec. 31, 1996

[54] SEISMIC PIPE RESTRAINT AND METHOD FOR USING THE SAME

[75] Inventor: Ralph M. Kallenbach, Elgin, Ill.

[73] Assignee: Sargent & Lundy, Chicago, Ill.

[21] Appl. No.: 441,138

[22] Filed: May 15, 1995

[51] Int. Cl.$^6$ ........................................................ F16F 7/12
[52] U.S. Cl. ........................... 188/374; 188/67; 188/134; 188/371; 293/133
[58] Field of Search .................................. 188/134, 371, 188/372, 374, 376, 377, 129, 381, 67; 293/133; 74/492; 267/134, 196, 205, 207, 138, 139; 248/548

[56] References Cited

U.S. PATENT DOCUMENTS

| | | |
|---|---|---|
| 1,991,684 | 2/1935 | Ketel . |
| 3,354,991 | 11/1967 | Kenworthy . |
| 3,450,233 | 6/1969 | Massa ..................................... 293/133 |
| 3,482,653 | 12/1969 | Maki et al. ............................. 293/133 |
| 3,563,346 | 2/1971 | Bainbridge . |
| 3,643,765 | 2/1972 | Hanchen . |
| 3,865,356 | 2/1975 | Wossner . |
| 3,887,223 | 6/1975 | Bez ......................................... 293/133 |
| 3,899,047 | 8/1975 | Maeda et al. . |
| 4,062,994 | 12/1977 | Millman et al. . |
| 4,078,778 | 3/1978 | Hubweber . |
| 4,181,198 | 1/1980 | Lindberg . |
| 4,301,989 | 11/1981 | Kallenbach . |
| 4,589,301 | 5/1986 | Griner . |
| 4,823,923 | 4/1989 | Moyer ..................................... 293/133 |
| 4,955,467 | 9/1990 | Kallenbach ............................. 188/134 |
| 4,978,133 | 12/1990 | Thorne et al. . |
| 4,988,081 | 1/1991 | Dohrmann . |
| 4,995,486 | 2/1991 | Garneweidner . |
| 5,131,115 | 7/1992 | Sarto . |
| 5,176,421 | 12/1992 | Rink et al. ............................. 188/374 |
| 5,314,161 | 5/1994 | Domanski et al. . |
| 5,497,858 | 3/1996 | Cloud et al. . |

FOREIGN PATENT DOCUMENTS

| | | | |
|---|---|---|---|
| 3522449 | 1/1987 | Germany ............................... | 188/374 |

OTHER PUBLICATIONS

"The Disc Spring Pipe Restraint", Evans C. Goodling, Jr., Reprinted from The 1988 ASME Pressure Vessels and Piping Conference, Pittsburgh, PA, Jun. 19–23, 1988, ASME PVP vol. 144, pp. 187–192.
"Selected Publications on the Application of WEAR™ Pipe Restraints" ABB Impell Corporation, 1986–1992.
Grinnell Corporation Brochure, "Limit Stop", including draft paper entitled, McGuire Snubber Elimination Program by Robert L. Cloud, James S. M. Leung, William H. Taylor and Robert L. Morgan, Jr.
"E–Bar Technical Product Brochure".
Bush et al., Aging and Service Wear of Hydraulic and Mechanical Snubbers Used on Safety–Related Piping and Components of Nuclear Power Plants, NUREG/CR–4279, PNL–5479, vol. 1.

*Primary Examiner*—Douglas C. Butler
*Attorney, Agent, or Firm*—McDermott, Will & Emery

[57] ABSTRACT

A system for limiting the movement of a pipe due to a seismic event is disclosed, including an energy absorbing device for restraining the pipe in the event of the seismic event, and a clamp adapted be attached about the pipe at a point where the anticipated unrestrained movement due to a seismic event is greater than the anticipated thermal movement of the pipe. The energy absorbing device is connected at one of its ends to the clamp, and the opposite end of the energy absorbing device is adapted to be connected to a substantially immovable support structure or wall. The device includes a first elongated member having a hollow portion therein and a second member mounted within the hollow portion of the first member. One of the first and second members has its front end fixedly connected to the clamp, and the other one of the members has its rear end adapted to be connected fixedly to the support structure. The first member includes a first interference means and the second member includes a second interference device so that as the first and second members move longitudinally relative to one another, the first and second interference device engage one another forcibly and thereafter the first and second members continue relative movement for load and displacement limiting purposes until they come to rest.

15 Claims, 4 Drawing Sheets

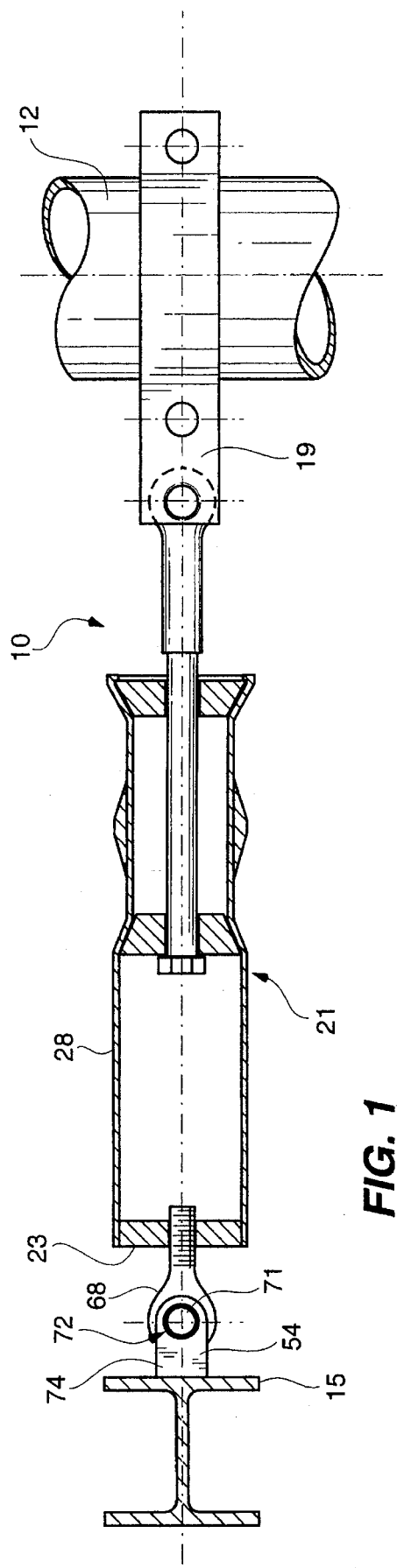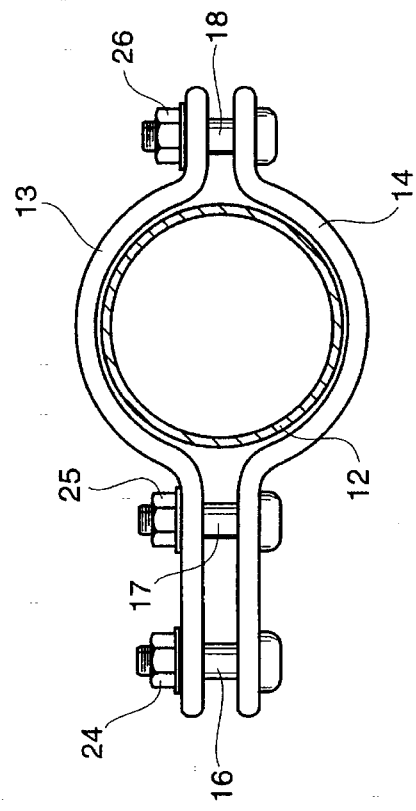

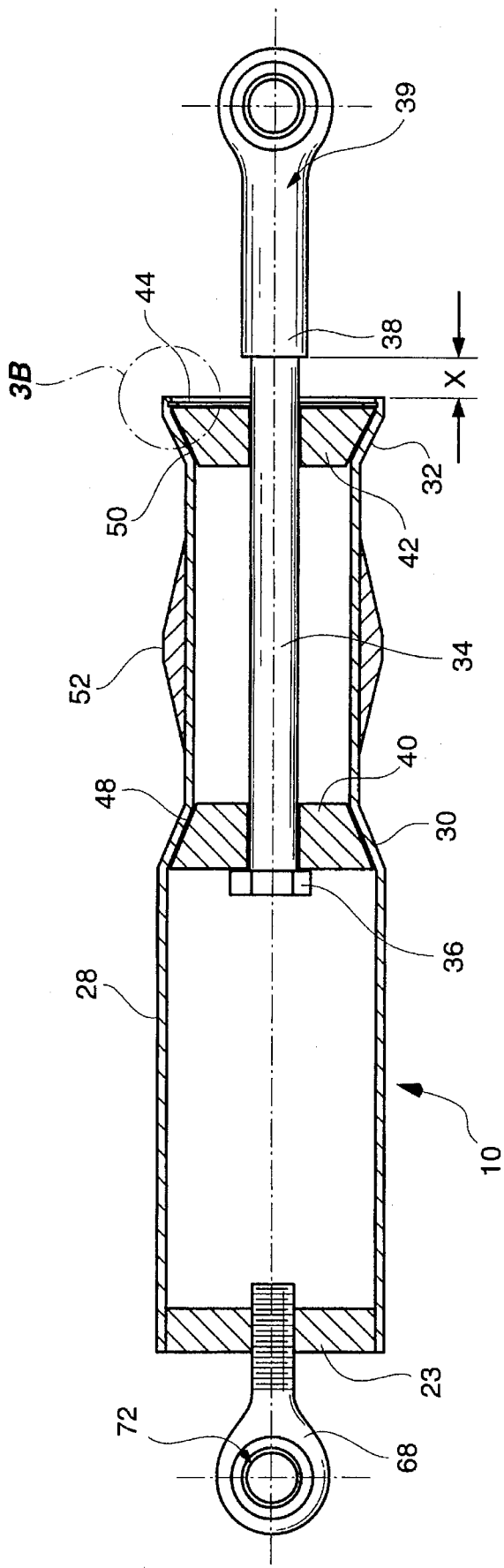
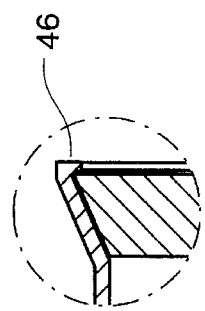
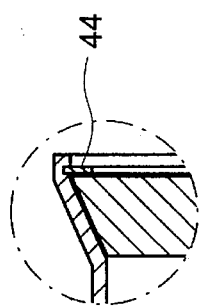

5,588,511

SEISMIC PIPE RESTRAINT AND METHOD FOR USING THE SAME

FIELD OF THE INVENTION

This invention relates in general to a restraint system and its method of use for pipes, conduits and other equipment and more particularly to a pipe restraint system and its method of use for restraint during the occurrence of dynamic events, especially due to seismic phenomena.

BACKGROUND OF THE INVENTION

Devices such as snubbers have been commonly applied in order to control dynamic excitation of piping systems from loads such as those caused by earthquakes. The intended function of these devices is to allow a pipe to move in order to accommodate normal operating conditions such as thermal movements, but to lock to prevent response to dynamic loading. Typically snubbers are either hydraulic or mechanical devices. Both types have experienced difficulties in service.

Mechanical snubbers often suffer damage to internal components which causes the snubbers to lock up and fail to accommodate free movement of the piping due to normal operational thermal cycling. This introduces the possibility of overloading of the piping and support system and the potential failure of the piping or the support system.

Hydraulic snubbers have the potential of leakage which could prevent them from adequately controlling the dynamic excitation of the piping. There is an additional record keeping complication with hydraulic snubbers because of the non-metallic components therein.

In nuclear power plants the history of failure of mechanical and hydraulic snubbers has led to a requirement for regularly scheduled inspection, testing and maintenance of all snubbers in a plant. These programs represent a significant financial burden to the owners of these power plants.

There have been efforts to provide simpler, more reliable substitute devices for snubbers in order to eliminate the costs of inspection, testing and maintenance programs. Among these approaches is the limit stop or gapped restraint. This type of device provides controlled limits within which the pipe can move freely to provide for normal operational movements but beyond which the pipe comes hard against a stop. It is generally true that when these devices bottom out due to dynamic loading, the impact loads on the device are unacceptably high for the existing building structure.

SUMMARY OF THE INVENTION

The present invention eliminates the foregoing disadvantages in the art by providing in a system for limiting the movement of a pipe due to a seismic event, a load limiting device for restraining the pipe and adapted to be attached to the pipe at a point where the anticipated unrestrained movement due to a seismic event is greater than the normal unrestrained thermal movement of the pipe or the desired restrained thermal movement of the pipe, along an imaginary line parallel to the longitudinal axis of the device. The load limiting device is connected by a pinned joint at one of its ends to a clamp which is in turn attached to the pipe, and the opposite end of the load limiting device is fixed by a pinned joint to a substantially immovable support structure such as a wall. The device includes a first elongated member having a hollow portion therein and a second member mounted within the hollow portion of the first member. One of the first and second members has its front end fixedly connected to the pipe clamp through a pinned joint, and the other one of the members has its rear end adapted to be connected fixedly to the support structure through a pinned joint. The first member includes a first interference means and the second member includes a second interference means so that as the first and second members move longitudinally relative to one another, the first and second interference means engage one another forcibly and thereafter continue relative movement for load limiting and energy absorbing purposes until they come to rest.

One object of the present invention is to provide characteristics of the gapped restraint or limit stop with the added feature that the maximum impact load will be limited to a predetermined load.

Another object of the present invention is to provide a restraint that will yield at a specific load, thus limiting the load imparted to the object connected to the restraint, such as the existing building structure.

An additional object of the present invention is to provide protection to a pipe system, including connected valves and equipment, and components and equipment adjacent to and near the pipe, from excessive seismic pipe movements.

Still an additional object of the present invention is to provide a restraint having a compact size.

A further object of the present invention is to provide a restraint that is easy to install and adjust to a correct position.

Another object of the present invention is to limit response due to dynamic excitation in a pipe.

Still a further object of the present invention is to provide a gapped restraint with adjustable free travel and length to allow the restraint to be installed to suit field conditions and allow the gap thereof to be adjusted after installation.

An additional object of the present invention is to provide a restraint that is easy to service and inspect.

Another object of the present invention is to provide a restraint that prevents moment loading on supporting structures.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 1 is a fragmentary plan view of a seismic restraint system, which is constructed in accordance with the present invention;

FIG. 2 is a plan view of one type of clamp that may be used in the seismic restraint system of the present invention;

FIG. 3 is a cross sectional view of one embodiment of a seismic pipe restraint constructed in accordance with the present invention;

DETAILED DESCRIPTION OF THE PREFERRED EMBODIMENTS

Figure 4:
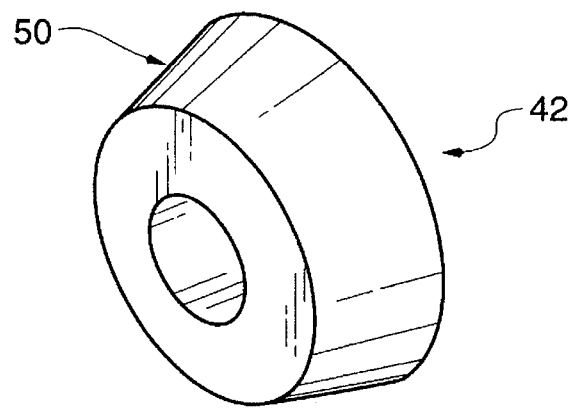
FIG. 4 is a perspective view of a wedge of one embodiment of the invention.

Referring now to the drawings, and more particularly to FIGS. 1 and 3 thereof, there is shown a seismic pipe restraint 10 which is constructed in accordance with the present invention, and which is shown attached to a pipe 12. The restraint 10 limits movement of the pipe 12 should a dynamic event, such as an earthquake, occur.

The pipe restraint 10, as hereinafter described in greater detail, includes a clamp 19 which is attached to pipe 12 and a radially-extending load limiting device 21 connected between the clamp 19 and the building structure 15.

FIG. 2 shows one type of clamp 19 that may be used to attach the load limiting device 21 to the pipe 12. The clamp shown in FIG. 2 is commonly referred to as a double bolt pipe clamp and includes two opposing straps 13, 14, each defining a half-moon shape for receiving at least a portion of pipe 12. The two opposing straps 13, 14 are held together about pipe 19 by bolts 16, 17, 18 and nuts 24, 25, 26. It should be understood that other types of pipe clamps known to those of ordinary skill in the art may also be used in pipe restraint 10.

Referring to FIG. 3, there is shown a seismic pipe restraint 10, which is constructed in accordance with the present invention and which is used to limit the motion of pipe 12 in the event of a seismic occurrence. The restraint 10 includes one or more load limiting devices 21, and each load limiting device 21 is connected at one of its ends to the pipe 12 by means of a clamp 19.

The load limiting device 21 includes an outer tube 28 having a pair of axially spaced-apart internal shoulders 30 and 32 which are transitions between outer larger diameter portions of the tube 28 and a central restricted diameter portion. Endplate 23 defines a threaded hole adapted for use in attaching the load limiting device 21 to building structure 15, as will be described in detail below.

An inner concentric shaft 34 is slidably mounted for free movement within outer tube 28 in a telescoping manner. Cap 36 of the inner shaft 34 is disposed within the outer tube 28 at the left end enlarged portion thereof as viewed in FIG. 3 of the drawings. Enlarged shaft portion 38 of the shaft 34 is disposed outside of the outer tube 28 to the right of the end of the tube 28 as viewed in FIG. 3 of the drawings and includes a spherical rod end 39, which allows for universal rotation and through which bolt 16 of clamp 19 is received. A pair of annular wedge members 40 and 42 surround freely the shaft 34 and are disposed between the respective enlarged portions 36 and 38 and the internal annular shoulders 30 and 32, respectively. The wedge members 40 and 42 include a pair of tapered surfaces 48 and 50, respectively, for engaging the complementary-shaped inclined surfaces of the respective shoulders 30 and 32. A perspective view of wedge member 42 is shown in FIG. 4, it being understood that wedge member 40 is of the same general shape.

Preferably tube 28 is made of mild steel or austinitic stainless steel for maximum ductility and wedges 40 and 42 are made of a much harder material such as tool steel or martinsitic stainless steel. However, other types of materials can also be used. The thickness of tube 28 varies depending on the particular environment in which the restraint 10 is placed. In one embodiment, tube 28 has a thickness of 0.125 inches when an anticipated force resulting from a seismic event is approximately 1180 pounds, excluding frictional forces. In one preferred embodiment, where tube 28 has a thickness of 0.125 inches, the tapers of wedges 40 and 42 are between approximately 10° and 20°. It should be understood that the tapers of wedges 40 and 42 may be of different angles or the same angle. It should also be understood that where a larger thickness is employed for tube 28, then, preferably, the angles of the tapers of wedges 40 and 42 are reduced; and, conversely, where a smaller thickness is employed for tube 28, then, preferably, the angles of the tapers of wedges 40 and 42 are increased.

Wedge 42 is retained within tube 28 by retaining means, such as snap ring 44 or by rolling the end of tube 28, as shown at 46. Snap ring 44 defines an aperture sufficiently large to allow one end of enlarged shaft portion 38 to pass therethrough and impact wedge 42. Snap ring 44 is received by a slot extending about the inner circumference of the end of tube 28. Alternatively, snap ring 44 may be threaded and screwed into the end of tube 28. Use of snap ring 44 would be most appropriate when the thickness of tube 28 is such that a sufficiently deep groove might be easily machined into the inner circumference of the tube 28. In all other instances, it would be most appropriate to roll the end of tube 28 over the outer edge of the wedge 42. Preferably snap ring 44 is made of high strength steel.

Figure 6:
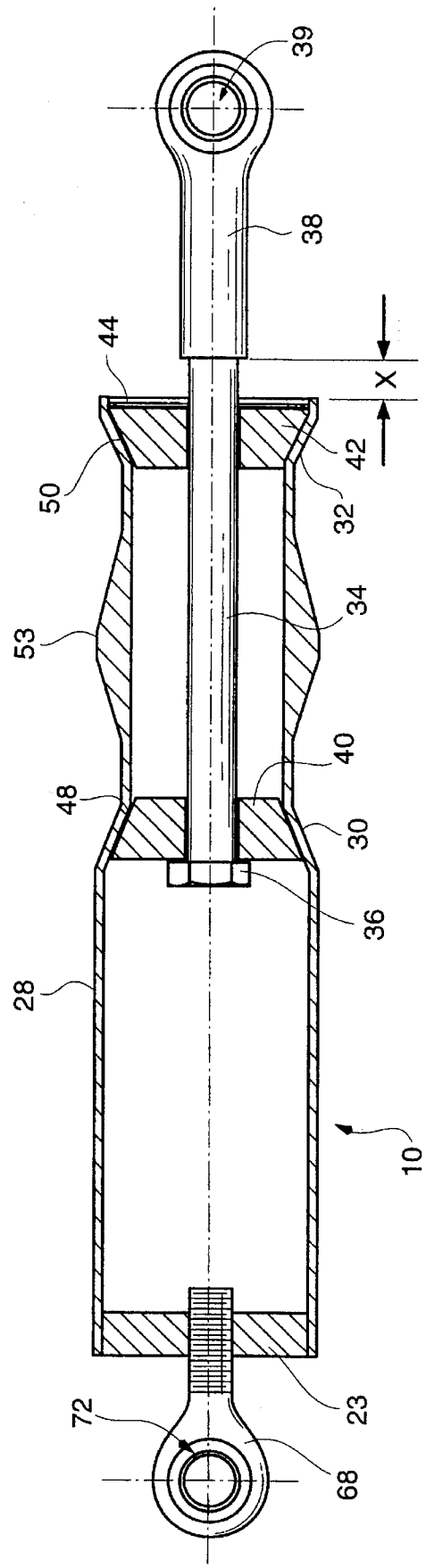
FIG. 6 is a cross sectional view of another embodiment of a seismic pipe restraint constructed in accordance with the present invention.

Reinforcement means, in the form of heavy stop ring 52 is attached to the outer circumference of tube 28, between shoulders 30 and 32, and acts as a positive stop. Stop ring 52 may be made of the same material as tube 28 or other similar materials and is tapered on either side, preferably at a low angle of approximately 15° or less, so there will not be a sudden increase in the rigidity of the unit from the normal limit load to the ultimate capacity. The device will continue to yield, absorbing energy at ever increasing load magnitudes as wedge 40 or 42 is driven into the stop section until the total cross sectional area being plastically strained reaches that which would generate the ultimate capacity of the restraint. Load limiting device 21 is normally designed so that the maximum displacement of the device 21 would not engage stop ring 52. The stop ring 52 functions to provide an additional safety margin. Because of the taper of the stop ring 52, the load limit on the device will be no higher than what is needed to mitigate the effects of the dynamic event. It should be understood that stop ring 52 could also be used without one or both tapers. Instead of stop ring 52, the reinforcement means may take the form of the wall thickness of tube 28 being constructed to reflect the additional thickness stop ring 52 would have provided, whether tapered or not. In FIG. 6, where references numbers identical to those in FIG. 3 refer to the same elements, an embodiment of the present invention using a thickened wall 53 is shown.

Figure 5:
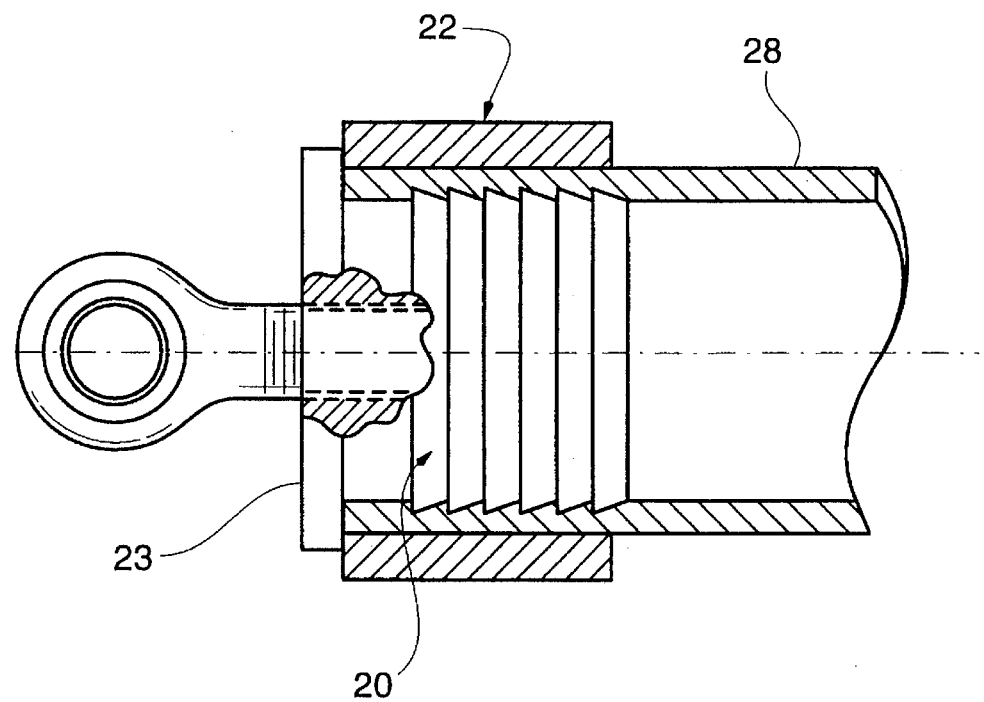
FIG. 5 is a partial plan view of an end fitting of one embodiment of the present invention.

FIG. 5 illustrates one method by which endplate 23 can be attached to tube 28, wherein endplate 23 is part of an end fitting 20 which includes tooth-type grooves with an outer diameter larger than the inner diameter of the tube 28. A doubler ring 22 is placed on the end of tube 28 with a very tight fit. The end of tube 28 is heated or conversely, the end fitting 20 may be chilled and the end fitting 20 is inserted into the tube 28; thus, upon cooling, achieving a shrink fit between end fitting 20 and tube 28 adequate to sustain the maximum load on the device 21. Alternatively, end fitting 20 could be simply threaded into tube 28 or the parts could be welded together.

Rod end 68 is threaded into endplate 23 of load limiting device 21. Rod end 68 is connected to bracket 54 by means of pin 71 which extends through a spherical rod end 72, which allows for universal rotation, and through aligned holes of a pair of clevis plates, only one of which is shown in FIG. 1 as 74. Bracket 54 is connected to an immovable support structure or wall 15. In this way the load limiting device 21 is able to take up energy along the longitudinal axis of the device 21.

During normal operation, the inner shaft 34 is free to move axially and slidably back and forth within the outer tube 28 through a distance X, which is a distance of free travel or movement between the respective enlarged portions 36 and 38 and the wedge members 40 and 42, respectively, when they are disposed in engagement with the respective annular shoulders as shown in FIG. 3. This freedom of movement accommodates movement of the pipe 12 due to normal thermal expansion and the like. In some applications, the load limiting device may be designed such that distance X is zero, such that there is no free travel or movement between the respective enlarged portions 36 and 38 and the wedge members 40 and 42. In such applications, load limiting device 21 will immediately absorb energy due to any type of movement. As those of ordinary skill in the art will appreciate, depending on the placement of the load limiting device 21 relative to clamp 19 and bracket 54, the free travel or movement may not be unidirectional, as shown in FIGS. 1 and 2. The free travel or movement could be bidirectional and possibly greater in one direction than another.

When a large enough dynamic event, such as a large enough seismic event, occurs, the resulting force causes pipe 12 to move and, consequently, movement occurs in the load limiting device 21 of the restraint 10. The device 21 is either placed in tension or compression. The inner shaft 34 of the device 21 moves axially with deformation of outer tube 28 occurring until the inner shaft 34 comes to a rest position. In so doing, the restraint 10 assumes a lengthened or shortened configuration to absorb the energy produced by the dynamic event. It will be appreciated that pipe loads acting on the device 21 below a predetermined amount will not cause wedge members 40 or 42 to move, and the device 21 will not absorb energy. Further, the maximum device load from pipe 12 will be limited to that predetermined amount unless the stop ring 52 is engaged. The predetermined amount is based on the size, materials and configuration of the load limiting device 21.

More particularly, when a seismic or other dynamic force occurs to produce a large enough relative movement between the inner shaft 34 and the outer tube 28, one of the enlarged portions 36 or 38 moves through a distance of free movement into engagement with its wedge member 40 or 42 to carry it forcibly into engagement with the corresponding internal annular shoulder 30 or 32 of the outer tube 28. Thereafter, the wedge member 40 or 42 is moved forcibly relative to the shoulder 30 or 32 and the tube 28 for deforming it radially outwardly in either a plastic or an elastic manner for energy absorbing purposes until the inner shaft 34 and the outer tube 28 come to rest relative to one another after the wedge member 40 or 42 has moved forcibly through an energy absorbing distance.

Preferably, load limiting device 21 is attached to pipe 12 at a point where the anticipated unrestrained movement of the pipe 12 due to a seismic event, is greater than the anticipated normal unrestrained or anticipated desired restrained thermal movement of pipe 12 at such point. Determination of the anticipated unrestrained movement of pipe 12 due to a seismic or other dynamic event and the anticipated thermal movement of pipe 12 can be calculated using various techniques that are well known to those of ordinary skill in the art. However, load limiting device 21 may also be placed at other points along pipe 12. In practice, it is anticipated that an existing snubber may be replaced by load limiting devices such that existing pipe clamps and wall brackets may be used, provided that the preceding relationship between anticipated thermal movement and anticipated seismic movement is met.

Considering now the limiting load developed by the restraint 10, the following is an equation which defines, ignoring friction, the inter-relationship of the unit load and the deformation of the load limiting device 21:

$$P \cdot \Delta = S_p \cdot \epsilon_p \cdot V$$

where:
P is unit load
$\Delta$ is displacement of wedge 40 or 42
$S_p$ is plastic stress
$\epsilon_p$ is plastic strain
V is volume of material strained
Since $$V = \pi \cdot D \cdot t \cdot \Delta$$

where t is the thickness of the tube 28; then, $$P = \pi \cdot D \cdot t \cdot S_p \cdot \epsilon_p$$

However, $$\epsilon_p = \delta D/D$$

where $\delta D$ is the increase in diameter of tube 28. Therefore, $$P = \pi \cdot t \cdot \delta D \cdot S_p$$

For example, where a tube 28 having a diameter of 1.5 inches and a wall thickness of 0.125 inches is used, and the increase in diameter is 0.05 inches and the plastic stress is 60,000 psi, then, $$P = \pi \cdot (0.125) \cdot (0.050) \cdot (60,000)$$

$$P = 1180 \text{ lbs.}$$

Since frictional forces are not included, the actual load will be slightly higher than 1180 lbs.

It will become apparent to those skilled in the art that more than one load limiting device may be employed at a single location on a pipe with an appropriate clamp for certain applications, if desired. Also, markings may be placed on the outside of tube 28, or other means may be used, to visually indicate the amount of axial movement of the load limiting device 21 or components thereof, to aid in the inspection and servicing of the load limiting device 21.

While various forms and modifications have been described above and illustrated in the drawings, it will be appreciated that the invention is not limited thereto but encompasses all variations and expedients within the scope of the following claims. Although the load limiting device of the invention has been described in connection with its use to provide restraint during the occurrence of seismic phenomena, it should be understood that the load limiting device could also be used for other dynamic loads, such as fluid transient loads or loads from a postulated pipe break.

What is claimed is:

1. A load limiting device comprising:

a housing defining a generally cylindrical hollow portion and including a wall defining an inner surface, an outer surface and multiple diameters;

said wall including a first shoulder at a first location where the diameter of said wall changes and a second shoulder at a second location where the diameter of said wall changes;

a shaft at least partially received by said housing;

said shaft including a first wedge defining a first angled surface and a second wedge defining a second angled surface;

said first and second wedges received by said housing and movable within said housing;

one of said housing and said shaft being fixedly connected to an object subject to displacement relative to a support structure and the other of said housing and said shaft being connected to said support structure;

means, located between said first shoulder and said second shoulder, for resisting the movement of said first and second wedges in the region of said housing defined between said first shoulder and said second shoulder;

said resisting means having a first resistance in a first region adjacent said first shoulder, a second resistance in a second region adjacent said second shoulder and a third resistance in a third region between said first region and said second region, said third resistance being substantially greater than said first resistance and said second resistance; and said first angled surface of said first wedge engaging said first shoulder and plastically deforming said wall once a predetermined amount of relative force has been imparted between said first wedge and said first shoulder and said second angled surface of said second wedge engaging said second shoulder and plastically deforming said wall once a predetermined amount of relative force has been imparted between said second wedge and said second shoulder.

2. The load limiting device of claim 1 wherein said resisting means includes a portion of said wall and a wall stiffening device.

3. The load limiting device of claim 2 wherein said wall stiffening device includes a ring located around a portion of said housing on the outer periphery of said housing.

4. The load limiting device of claim 3 wherein said ring is nonunitary with said wall.

5. The load limiting device of claim 4 wherein said ring defines a wall having a thickness, said thickness tapering between a first thickness and a second thickness smaller than said first thickness.

6. The load limiting device of claim 5 further including means for retaining said first and second wedges within said housing.

7. The load limiting device of claim 6 wherein said inner surface of said wall defines an inner circumference and further defines a slot along said inner circumference and wherein said retaining means includes an end ring received in said slot.

8. The load limiting device of claim 7 wherein said wall includes a first end and said retaining means includes said first end of said wall turned inward into said hollow portion.

9. The load limiting device of claim 3 wherein said ring acts as a stop and defines a wall having a thickness, said thickness tapering between a first thickness and a second thickness smaller than said first thickness.

10. The load limiting device of claim 9 wherein said ring is nonunitary with said wall.

11. The load limiting device of claim 10 further including means for retaining said first and second wedges within said housing.

12. The load limiting device of claim 11 wherein said inner surface of said wall defines an inner circumference and further defines a slot along said inner circumference and wherein said retaining means includes an end ring received in said slot.

13. The load limiting device of claim 12 wherein said wall includes a first end and said retaining means includes said first end of said wall turned inward into said hollow portion.

14. The load limiting device of claim 1 wherein said resisting means includes a stop.

15. The load limiting device of claim 1 wherein said resisting means includes a portion of said wall having a thickness substantially greater than the thickness of portions immediately adjacent thereto.

* * * * *